US010860521B2

(12) United States Patent
Morning-Smith et al.

(10) Patent No.: US 10,860,521 B2
(45) Date of Patent: Dec. 8, 2020

(54) POSITIONALLY AWARE COMMUNICATION WITH MULTIPLE STORAGE DEVICES OVER A MULTI-WIRE SERIAL BUS

(71) Applicant: Intel Corporation, Santa Clara, CA (US)

(72) Inventors: Andrew Morning-Smith, Vancouver (CA); Jawad B. Khan, Cornelius, OR (US); Fred W. Nance, Jr., Dupont, WA (US); Wing-Gong Lew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 533 days.

(21) Appl. No.: 15/395,821

(22) Filed: Dec. 30, 2016

(65) Prior Publication Data

US 2018/0189221 A1 Jul. 5, 2018

(51) Int. Cl.
*G06F 13/42* (2006.01)
*G06F 13/40* (2006.01)

(52) U.S. Cl.
CPC ...... *G06F 13/4282* (2013.01); *G06F 13/4022* (2013.01); *G06F 2213/0026* (2013.01)

(58) Field of Classification Search
CPC ............. G06F 13/4022; G06F 13/4282; G06F 2213/0026; G06F 3/0625; G06F 3/0655; G06F 3/0688
See application file for complete search history.

(56) References Cited

U.S. PATENT DOCUMENTS

| | | | | |
|---|---|---|---|---|
| 5,581,787 | A * | 12/1996 | Saeki | G06F 11/2289 |
| | | | | 710/9 |
| 7,725,767 | B2 * | 5/2010 | Sasaki | G06F 13/4081 |
| | | | | 714/13 |
| 9,940,275 | B2 * | 4/2018 | Venkatasubba | G06F 13/4068 |
| 10,204,066 | B2 * | 2/2019 | Miluzzi | G06F 13/364 |

OTHER PUBLICATIONS

SSD vs HDD; Feb. 4, 2015; StorageReview.com; https://web.archive.org/web/20150204085135/https://www.storagereview.com/ssd_vs_hdd; pp. 1-3 (Year: 2015).*

* cited by examiner

*Primary Examiner* — Idriss N Alrobaye
*Assistant Examiner* — Richard B Franklin
(74) *Attorney, Agent, or Firm* — Compass IP Law, PC

(57) ABSTRACT

Apparatuses, systems, and methods having positionally aware communication between a controller and a plurality of solid state drives (SSD) over a multi-wire serial bus is described. An example electronic device includes a multi-wire serial bus, multiple SSD connectors coupled to the multi-wire serial bus, and a serial bus position address (BPos) line to uniquely identify the physical position of each SSD connector with a unique BPos identifier (ID). The device also includes a serial bus controller coupled to the multi-wire serial bus and further comprising circuitry configured to communicate with a specific SSD connector at a known physical position by associating the BPos ID of the specific SSD connector with the communication.

26 Claims, 7 Drawing Sheets

Fig. 5A                              Fig. 5B

POSITIONALLY AWARE COMMUNICATION WITH MULTIPLE STORAGE DEVICES OVER A MULTI-WIRE SERIAL BUS

BACKGROUND

The storage of data has become an important consideration, the amount of data stored has increased exponentially over the years, from personal use to corporate, university, and government use, to name a few. A data center is an example of a facility that houses large amounts of storage. For example, a typical data center can include hundreds or thousands of storage devices, as well as computing nodes to control the vast amounts of data and data communication. Data centers can include network switches and/or routers to enable communication between different computing nodes/storage in the network. Data centers can employ redundant or backup power supplies, redundant data communications connections, environmental controls (e.g., air conditioning, fire suppression) and various security devices.

BRIEF DESCRIPTION OF THE DRAWINGS

FIG. 5A is a schematic illustration of a communication transaction of an SMBus communication protocol in accordance with an example embodiment.

FIG. 5B is a schematic illustration of a communication transaction of an SMBus communication protocol in accordance with an example embodiment.

DESCRIPTION OF EMBODIMENTS

Figure 1:
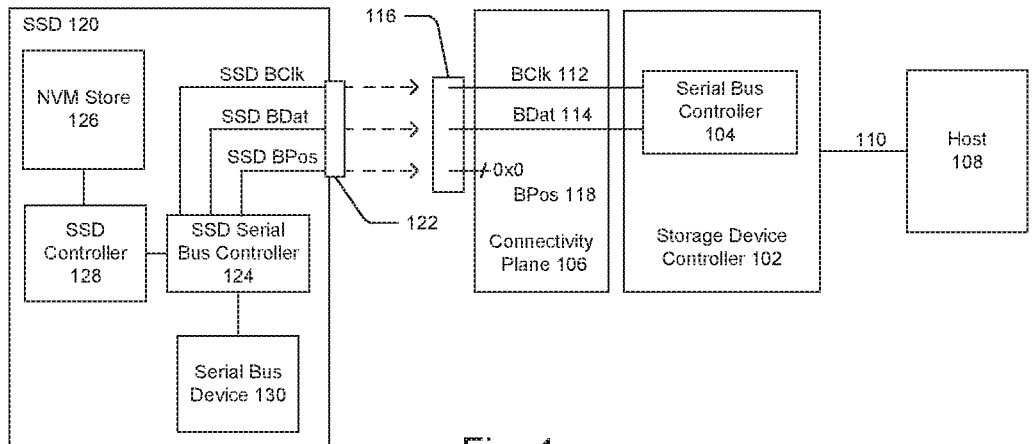
FIG. 1 is a schematic illustration of an electronic device coupleable to a SSD in accordance with an example embodiment.

Although the following detailed description contains many specifics for the purpose of illustration, a person of ordinary skill in the art will appreciate that many variations and alterations to the following details can be made and are considered included herein. Accordingly, the following embodiments are set forth without any loss of generality to, and without imposing limitations upon, any claims set forth.

It is also to be understood that the terminology used herein is for describing particular embodiments only, and is not intended to be limiting. Unless defined otherwise, all technical and scientific terms used herein have the same meaning as commonly understood by one of ordinary skill in the art to which this disclosure belongs. Also, the same reference numerals in appearing in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various embodiments. One skilled in the relevant art will recognize, however, that such detailed embodiments do not limit the overall concepts articulated herein, but are merely representative thereof. One skilled in the relevant art will also recognize that the technology can be practiced without one or more of the specific details, or with other methods, components, layouts, etc. In other instances, well-known structures, materials, or operations may not be shown or described in detail to avoid obscuring aspects of the disclosure.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of phrases including "an example" or "an embodiment" in various places throughout this specification are not necessarily all referring to the same example or embodiment.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

An initial overview of embodiments is provided below and specific embodiments are then described in further detail. This initial summary is intended to aid readers in understanding the disclosure more quickly, but is not intended to identify key or essential technological features, nor is it intended to limit the scope of the claimed subject matter.

The present disclosure relates to the addressing of multiple solid state drives (SSD) with positional awareness, or in other words, with an awareness of the actual physical position of each SSD. Such positional awareness allows a storage controller to utilize physical position information with interactions with particular SSDs. For example, the storage controller may turn on one or more fans to cool a specific SSD or SSDs at a specific location, toggle status indicators, trigger specific drive replacements or further maintenance, toggle light emitting diodes (LEDs) or other indicator on the SSD to allow identification of a specific device at the device's physical location, and the like. As another nonlimiting example, a storage controller may initiate a notification to a maintenance worker to spatially separate specific SSDs from one another that have a tendency to get hot, in order to spread the physical localities of hotspots across the array of SSDs.

Traditional attempts to address memory devices using, for example, the system management bus (SMBus) have met with mixed success, depending on the need for positional awareness, with each having various drawbacks. For example, one traditional solution is to assign SSDs with randomly assigned addresses over the SMBus. While this solution does allow the addressing of SSDs, it provides no positional awareness to the controller as to the physical location of each device. In such cases, the controller will be aware that a SSD is, for example, operating at a higher temperature than other SSDs, but it will not be aware of the device's physical location. In order to provide cooling, the controller would need to activate the fans of the entire array in order to ensure the hot SSD received an increased airflow.

In another traditional solution, each SSD can be individually wired with separate SMBus lines to the memory controller. This would provide positional awareness to the controller; however, the midplane wiring and the number of connections to the SMBus controller would be excessive, and thus would unnecessarily increase the cost and complexity of memory storage systems.

In yet another traditional solution, a carrier with address filtering can be used to add physical location information to communications between the controller and a SSD that has been assigned a random address. However, this solution further increases the complexity of the system, may degrade signal integrity, and adds address filtering components to the device or system that have a tendency to block or reduce airflow.

The presently disclosed technology overcomes these drawbacks, and allows a storage device controller to be positionally aware of multiple SSDs using a multi-wire serial bus with minimal wiring and hardware complexity. As used herein, the term "serial bus" refers to a multi-wire serial bus, unless the context clearly indicates otherwise. A storage device controller monitors and controls various aspects of system performance and operation through the multi-wire serial bus. Because the storage device controller knows the physical position of each SSD, the monitoring and controlling aspects become functionally associated to allow a more precise level of system management. For example, if a thermal sensor on a SSD detects excessive heat, the storage device controller can activate or increase the speed of one or more fans closest to the SSD to initiate or increase cooling.

In one example, positional awareness can be provided by using a multi-wire serial bus as a communication interface between the SSDs and a controller. Any multi-wire serial bus allowing communication between an SSD and a controller with positional awareness is considered to be within the present scope. Similarly, any communication protocol usable over a multi-wire serial bus with positional awareness would also be within the present scope. Nonlimiting examples of multi-wire serial buses can include Serial Peripheral Interface (SPI), Queued SPI (QSPI), Multichannel Buffered Serial Port (MCBSP), Microwire, Microwire plus, slave in/slave out (SISO), QuadSPI, mini-SPI (mSPI), Low Pin Count (LPC), enhanced SPI (eSPI), master output slave input/master input slave output (MOSI/MISO), Inter-Integrated Circuit (I2C), ACCESS.bus, Video Electronics Standards Association Display Data Channel (VESA DDC), Power Management Bus (PMBus), Intelligent Platform Management Bus (IPMB), Advanced Telecommunications Computing Architecture (AdvancedTCA), Micro Telecommunications Computing Architecture (MicroTCA), Two-Wire Interface (TWI), Two-Wire Serial Interface (TWSI), System Management Bus (SMBus), I3C, and the like, including combinations thereof. In one specific example, a multi-wire serial bus can include the system management bus (SMBus), originally defined by Intel®. Further details on the SMBus can be found at www.smbus.org. Another example of a multi-wire serial bus is the inter-integrated circuit (I2C) bus, details of which can be found at www.i2c-bus.org.

In addition to the SSDs themselves, a variety of multi-wire serial bus devices can be connected to the serial bus, which can provide monitoring and control functionality to the storage device controller. In some examples, various serial bus devices can be located onboard in a SSD, where the SSD and the serial bus device are connected to the serial bus. A serial bus device can be any device that has a multi-wire serial bus interface, and that can at least receive communications from a storage device controller over the serial bus. Thus, in an embodiment where a serial bus device is located in a SSD, both the SSD and the serial bus device can be distinctly identified by the storage device controller. Nonlimiting examples of general categories of serial bus devices can include sensors, control switches, indicators, or the like, or any other type of device that can monitor or control some aspect of SSD functionality. In other examples, serial bus devices can be located separately from a SSD, and can monitor and/or control system aspects external to SSD functionality. Examples can include, without limitation, temperature control via external fans, power supply regulation, system consoles and/or displays, and the like. Nonlimiting examples of serial bus devices can include thermal sensors, tachometers, voltage sensors, current sensors, fan monitoring circuits, control panel consoles, power supply monitors, nonvolatile memory (NVM) storage health monitors, digital sensors, digital indicators, analog sensors, analog indicators, switches, and the like, including combinations thereof.

In one nonlimiting example shown in FIG. 1, a storage device controller 102 includes a serial bus controller 104, and is communicatively coupled to a host 108 through a host interface 110. The serial bus controller 104 is coupled to the two interface wires of the serial bus, serial Bus Clock (BClk) 112 and serial Bus Data (BDat) 114, which communicatively couple with a SSD connector 116, in some examples through connectivity plane 106. The connectivity plane 106 also includes a serial Bus Position (BPos) address 118 set to a unique value that represents the physical location of the associated SSD connector 116. In other words, where multiple SSD connectors are coupled to the serial bus, each SSD connector will have a BPos set to a different value that represents the physical position of each connector to the serial bus controller 104. In example embodiments lacking a connectivity plane, the BPos can be coupled to the SSD connector, or to any other structure at the SSD connector.

When present, the connectivity plane 106 can have a variety of configurations, and as such the connectivity plane should not be limited to a given structural implementation. In some examples, the connectivity plane can comprise a printed circuit board (PCB) upon which the various serial bus and BPos addresses are disposed. The connectivity plane can also provide physical support for the SSD connectors 116, and to assist in connecting an SSD. In some examples, the connectivity plane 106 can include a storage device controller connector (not shown), thus allowing the storage device controller 102 to be removably coupled to the connectivity plane 106 using an appropriate matching connector. In another example, the connectivity plane can comprise a PCB or other supporting structure, and the storage device controller can be integrated thereon. In yet another example, the connectivity plane can comprise a PCB or other supporting structure having both the SSD connectors and the storage device controller integrated thereon.

A SSD 120 can be coupled to the SSD connector 116 via a matching connector 122, thus electrically coupling the BClk 112, BDat 114, and BPos 118 lines to the respective SSD BClk, SSD BDat, and SSD BPos connectors of the SSD 120. The SSD 120 can include a variety of components, depending on the architecture and use of the device. In one nonlimiting example, as shown in FIG. 1, the SSD 120 can include a SSD serial bus controller 124 communicatively coupled to the BClk, BDat, and BPos. The SSD serial bus controller 124 is in communication with an SSD controller 128 and any serial bus devices 130 included on the SSD 120. The SSD serial bus controller 124 can be distinct from the SSD controller 128, or the SSD serial bus controller 124 can be integrated into, or partially integrated into, the SSD controller 128. The SSD controller 128 is coupled to a NVM store 126, and processes data requests directed to the NVM store 126.

Upon connection of the matching connector 122 of the SSD 120 to the SSD connector 116, the unique value of the BPos 118 is communicated to the SSD serial bus controller 124 via the BPos. The identity of the SSD 120 and the associated unique value of the BPos 118 provides the serial bus controller 104 with positional awareness of the specific SSD 120. This allows the serial bus controller 104 to communicate with a SSD at a specific physical location out of a plurality of SSDs because that specific SSD is aware of its unique BPos ID, and will respond to communications including that associated BPos ID.

The NVM in the SSDs described herein are not limited to any particular type of NVM. NVM is a type of memory that does not require power to maintain the state of data stored by the medium. Nonlimiting examples of NVM can include any or a combination of: solid state memory (such as planar or three-dimensional (3D) NAND flash memory, NOR flash memory, or the like), cross point array memory, including 3D cross point memory, phase change memory (PCM), such as chalcogenide PCM, byte addressable NVM, ferroelectric memory, silicon-oxide-nitride-oxide-silicon (SONOS) memory, polymer memory (e.g., ferroelectric polymer memory), ferroelectric transistor random access memory (Fe-TRAM), ovonic memory, spin transfer torque (STT) memory, nanowire memory, electrically erasable programmable read-only memory (EEPROM), magnetic storage memory, write in place non-volatile MRAM (NVMRAM), and the like. In some examples, non-volatile memory can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Additionally, SSDs should not be limited to a particular form factor or other structural implementation. For example, in some cases the SSDs can each be contained in a separate device housing. In other cases, multiple SSDs can be coupled to SSD connectors in a common housing, such as, for example, a memory storage chassis or other rack-mounted structure. In some cases, SSDs contained in a common housing can also include a separate housing. Such SSDs can, in some cases, be structurally configured as an expansion card, such as a SSD blade.

As has been described, various serial bus devices can be coupled to the serial bus, and can either be located in, or apart from, the SSD 120. Each of these serial bus devices has a serial Bus Address (BAddr) that allows communication with the serial bus controller 104 over the serial bus. In one example of a serial bus device on the SSD 120, the serial bus controller 104 can communicate specifically with such devices by associating the BPos ID of the SSD 120 and the BAddr of the particular serial bus device 130 with the communication or command. Similarly, the serial bus device 130 can communicate in a positionally aware manner back to the serial bus controller 104 by associating the BPos ID of the SSD 120 and its own BAddr with the communication.

The BPos ID from the BPos can be communicated/set in a variety of ways, and should not be limited to a particular implementation. For example, the BPos ID can be an encoded value, a voltage level value, a resistance value, a capacitance value, or the like, including appropriate combinations thereof. As such, the BPos can include circuitry to communicate the BPos ID to a SSD using simple encoded bit, voltage, resistance, or capacitance values. For example, voltage can be divided into a series of voltage levels using, for example, a resistor ladder. Each BPos receives a different voltage value that represents the BPos ID for that particular BPos. In another example, each BPos can include an ID circuit that establishes an encoded bit value. For example, a 3-bit encoded value can be represented using a circuit having a resistor for each bit. In this case, a pull-up resistor can signify a "1" state, and a pull-down resistor can signify a "0" state. Thus, a circuit with a resistor sequence of pull-up, pull-up, and pull-down, would signify a binary value of 110, which can be read from the output impedance of the circuit. Each combination of resistors has a different output impedance, in steps across a range from 000 to 111. The step size can be varied through the resistance values of the resistors used in the circuit.

The storage device controller 102 and the serial bus controller 104 can be implemented in a variety of configurations, and should not be limited to any specific architecture or configuration. In some examples, the storage device controller can be a distinct unit with a primary role of serial bus communications along with the serial bus controller. In other examples, the storage device controller can function as a memory controller for data requests between the host 108 and the NVM store 126, in some examples through SSD controller 128, as well as controlling the serial bus communications through the serial bus controller 104. Thus, the storage device controller can include any component, circuit, buffer, electronic element, or the like, that is known in a memory controller design. In addition to any serial bus circuitry, non-limiting examples can include a command interface, a data serial bus, a processor, core memory controller circuitry, a buffer, a lookup table, or the like, including combinations thereof. The storage device controller can include a lookup table where the BPos ID of each SSD connector can be correlated with the associated SSD. Such a lookup table can reside in the storage device controller, in the serial bus controller, or in both. Additionally, other techniques for correlating the BPos IDs with the SSDs is contemplated, such as, for example, using an association algorithm. The storage device controller/serial bus controller can additionally include circuitry to implement such other association techniques.

In some examples, the serial bus controller can be integrated with the storage device controller, or can be an integrated part or circuitry of the storage device controller. In other examples, the serial bus controller can be separate or distinct from the storage device controller. As such, the terms "serial bus controller" and "storage device controller" can be used interchangeably herein, at least with respect to serial bus interactions. Regardless of the level of integration of the serial bus controller and the storage device controller, the serial bus controller monitors the performance and operation of SSDs, as well as serial bus devices, that are coupled to the serial bus. Reference herein to serial bus interactions using the term "storage device controller" thus refer to serial bus controller functionality.

The host 108 can be a processor, memory controller, computer, data interface to external computing and networking resources, and the like. In some examples, the host can be present in a common chassis with the SSDs and the storage device controller, while in other cases the host can be located apart from the SSDs and/or the storage device controller, such as, physically coupled to a common system or present at a remote location.

The nature of the host interface 110 can depend on the nature of the host 108. For example, in one embodiment the host can be an integrated controller in a central processing unit (CPU) or system-on-a-chip (SoC), a Northbridge, or the like, and the storage device controller can be, or can be part of, a memory controller, controller hub, Southbridge, or the like, communicating with the host over an internal bus. In another example embodiment, the host can be a memory controller, controller hub, Southbridge, or the like, communicating with the storage device controller over an external bus. Various nonlimiting examples of external bus host interfaces are contemplated, such as Peripheral Component Interconnect (PCI), PCI Express (PCIe), Serial Advanced Technology Attachment (SATA), Serial Attached Small computer system interface (SAS), NVM Express (NVMe), Remote Direct Memory Access (RDMA), Universal Serial Bus (USB), Small Computer System Interface (SCSI), Internet SCSI (iSCSI), Institute of Electrical and Electronics Engineers (IEEE) 1394 (Firewire), another multi-wire serial bus, and the like. Additionally, in some examples the host and the storage device controller can be separate from one another, while in other examples the host and the storage device controller can be integrated or closely associated.

Figure 2:
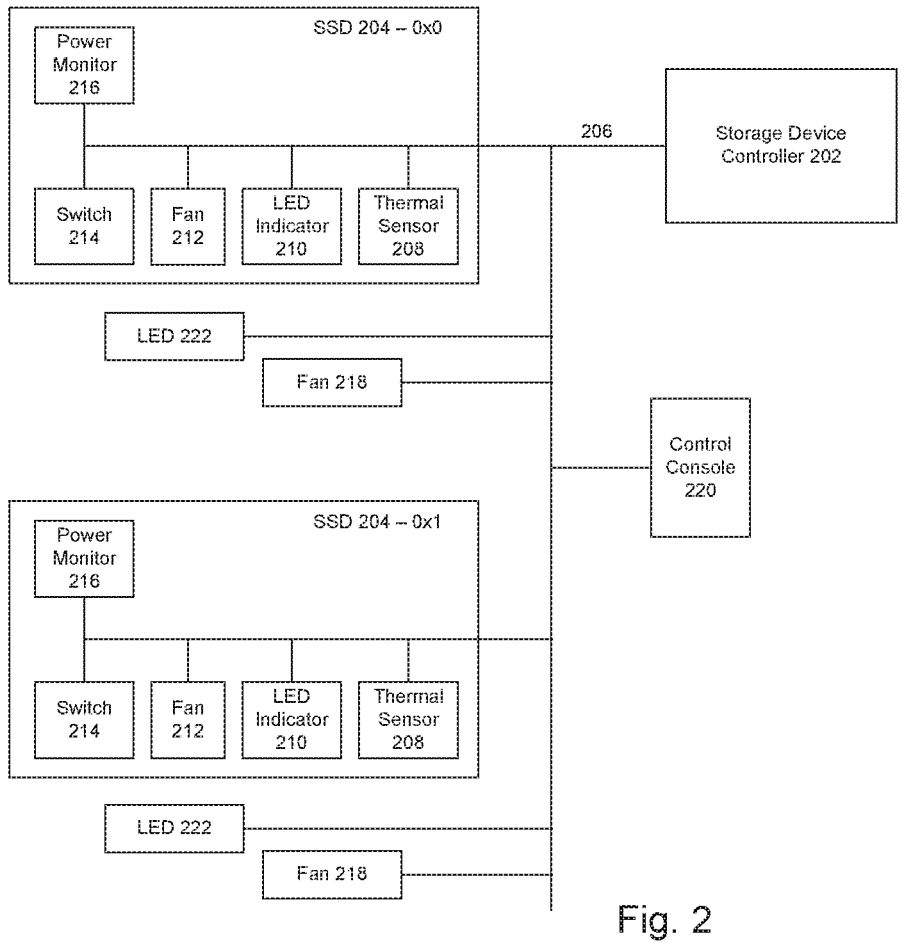
FIG. 2 is a schematic illustration of an electronic device coupled to a plurality of SSDs in accordance with an example embodiment.

FIG. 2 shows a simplified schematic of one example embodiment including a storage device controller 202 communicatively coupled to multiple SSDs 204 over a multi-wire serial bus 206. Each SSD 204 includes a BPos ID (0x0, 0x1) that uniquely identifies the SSD 204 to the storage device controller 202, including the device's physical location. Each SSD 204 is shown with a nonlimiting example selection of serial bus devices for illustration purposes only, including a thermal sensor 208, an LED indicator 210, an onboard fan 212, a switch 214, and a power monitor 216. In addition to onboard serial bus devices, FIG. 2 also shows a fan 218 and an LED 222 that are positioned in proximity to each of the SSDs 204, and a control console 220. In addition to the BPos ID assigned to each SSD 204, each serial bus device has a unique address that identifies that device to the storage device controller 202. It is noted, that as a simplified schematic, various components of the SSDs and the storage device controller are not shown for clarity.

In operation, the storage device controller 202 communicates with the SSDs 204 over the serial bus 206 to monitor the SSDs' operation and performance, and to make adjustments or changes to such operation and performance. For example, the storage device controller may send a command to the thermal sensor 208 of the SSD 204—0x0 to retrieve the temperature of that device. Upon receiving the temperature, the storage device controller can check the speeds of the onboard fan 212 and the external fan 218, and then send a command to one or more of these fans to turn on, turn off, or adjust rotational speed, depending on whether the temperature indicates that the device is too hot or sufficiently cool. While the storage device controller 202 may not require positional awareness of a particular SSD to monitor and adjust an onboard fan 212, positional awareness allows the storage device controller 202 to monitor and adjust an external fan 218 that is near the thermal sensor 208 of the particular SSD. In other operational examples, the storage device controller 202 may determine that a SSD 204 is experiencing power fluctuations or failure, either by querying the power monitor 216, or by receiving a notification generated by the power monitor. In one example response, the storage device controller 202 can send a command to the onboard switch 214 of the affected SSD 204 to initiate a power down. The storage device controller 202 can then send a command to the external LED 222 physically positioned at, and associated with, the affected SSD. In one example, the state of the external LED 222 identifies the SSD that has been powered down. Furthermore, the storage device controller 202 may activate a LED or other indicator on the control console 202 that includes a physical location map or other identifier to provide notification to the maintenance worker. It is additionally considered that indicators on the control console 220, as well as the external LED 222, can be turned on in the default state, and can be turned off by the storage device controller 202 as an indicator of a problem or potential problem.

Figure 3:
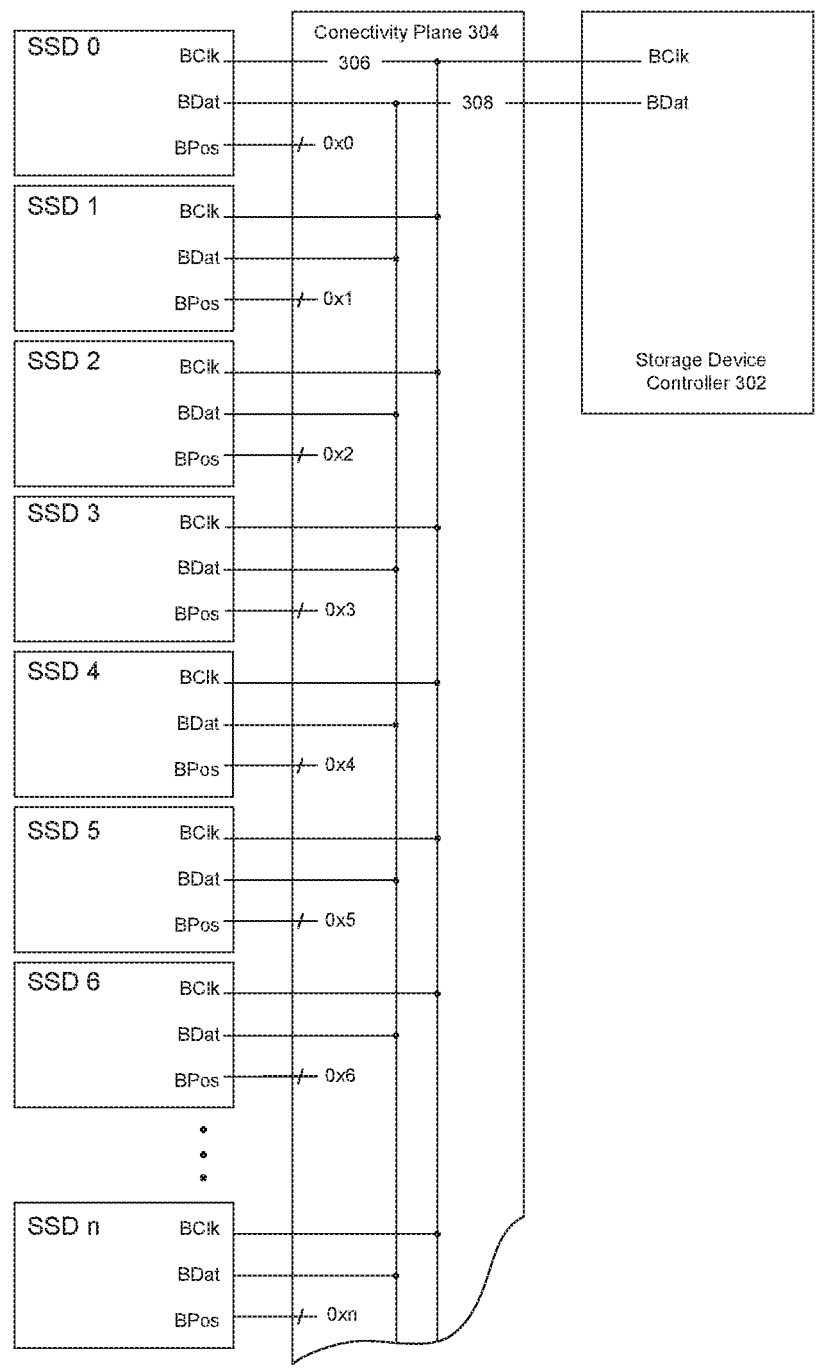
FIG. 3 is a schematic illustration of an electronic device coupled to a plurality of SSDs in accordance with an example embodiment.

FIG. 3 shows an example embodiment of a storage device controller 302 communicatively coupled to a plurality of SSDs (NVM 0-NVM n) over a multi-wire serial bus, or more particularly, the BClk and BDat lines of the serial bus. In some embodiments, a connectivity plane 304 is located between the storage device controller 302 and the SSDs. The connectivity plane 304 carries the BClk and BDat lines to communicatively couple the storage device controller 302 to each SSD, or in some cases, the SSD connector (not shown) associated with each SSD. The BClk and BDat lines from the plurality of SSDs communicatively couple with the storage device controller through a BClk crossing net 306 and a BDat crossing net 308 on the connectivity plane 304. In some examples, the BClk crossing net 306 is a single BClk crossing net, and the BDat crossing net 308 is a single BDat crossing net. Additionally, connectivity plane 304 includes the BPos ID (0x0-0xn) that is communicated to each SSD to facilitate positional awareness.

FIG. 3 thus shows a storage device controller 302 that is communicatively coupled to, and positionally aware of, a plurality of SSDs, and that this communicative coupling and positional awareness is achieved over the single pair of serial bus lines, with minimal wiring and hardware complexity, and without using a carrier with circuitry for serial bus address filtering.

Figure 4:
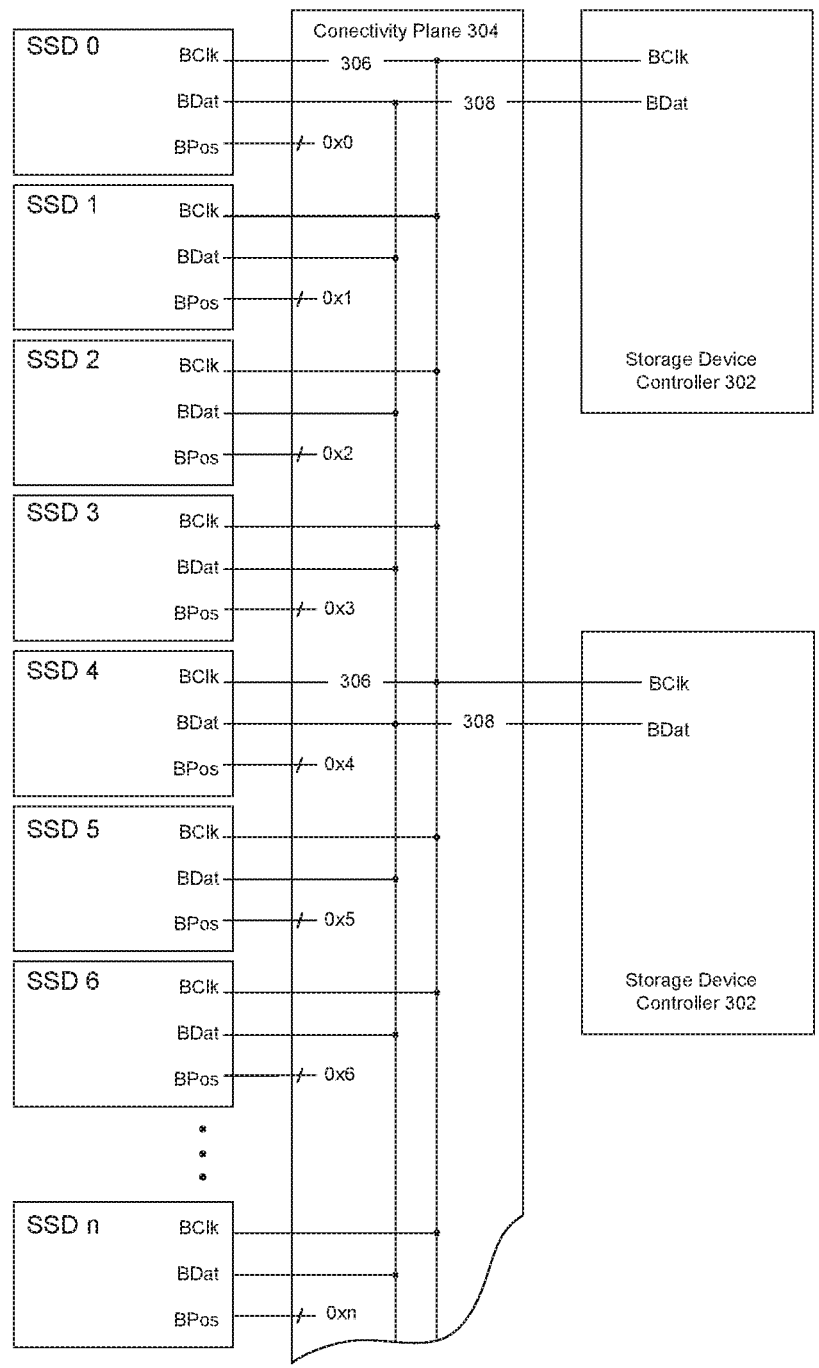
FIG. 4 is a schematic illustration of an electronic device coupled to a plurality of SSDs in accordance with an example embodiment.

FIG. 4 shows a similar example embodiment to FIG. 3, that includes multiple storage device controllers 302. Multiple storage device controllers can be utilized for any number of reasons, any of which is considered to be within the present scope. For example, in one embodiment multiple storage device controllers can be used for redundancy. In another embodiment, multiple storage device controllers can be utilized to function in parallel with one another. Such parallel functionality can be implemented so that the multiple storage device controllers share the same monitoring and/or device regulation responsibilities, or so that the multiple storage device controllers have divided responsibility with respect to monitoring and or device regulation.

In general, the storage device controller (master) issues commands to serial bus devices (slave), generates clocks signals, and terminates communication transfers. While the following examples include a description of details related to SMBus, this is for convenience, and is not to be taken as limiting. In some examples, any detail can be utilized as provided by SMBus specification version 1.0, published Dec. 10, 1999, SMBus specification version 2.0, published Aug. 3, 2000, and SMBus specification version 3.0, published Jan. 16, 2015 (see smbus.org). Depending on the transaction type, a master in a transaction may transmit data to a slave device (master-transmitter) or it may receive data from a slave device (master-receiver). A slave device (serial bus device) thus responds to its own address and receives commands. Depending on the transaction type, a slave may either receive data from a master device (slave-receiver) or may send data to a master device (slave-transmitter). A typical serial bus device will have a set of commands by which data can be read and written. For example, a command can be 8 bits (1 byte) long, while command arguments and return values can often vary in length. Additionally, the SMBus 2.0 and current SMBus 3.0 specifications specify that the Most Significant Bit (MSB) is transferred first.

Examples of SMBus communication protocols can include Quick Command, Send Byte, Receive Byte, Write Byte, Write Word, Read Byte, Read Word, Process Call, Block Read, Block Write, Block Write-Block Read Process Call, Write 32, Read 32, Write 64, and Read 64. A few specific non-limiting examples of SMBus transaction data structures for specific protocols are shown in FIGS. 5A-F, and a key to the symbols used in the examples is presented in Table 1. It is noted that the example protocols and explanatory details are not intended to be limiting, and merely show implementations with respect to SMBus protocols 2.0 and 3.0.

TABLE 1

| Symbol | Meaning |
| --- | --- |
| Label (unshaded) | One or more bits sent from the master to the slave. A label may describe the data and may include specific values. |
| Label (shaded) | One or more bits sent from the slave to the master. A label may describe the data and may include specific values. |
| Device Address (unshaded) | A seven-bit destination address sent from the master to one or more devices on the SMBus. |
| Device Address (shaded) | A seven-bit device address being returned to the master from a slave device. |
| S | The START condition sent from a serial bus master device. |
| Sr | A REPEATED START condition sent from a serial bus master device |
| P | A STOP condition sent by a serial bus master device |
| Rd | Read (bit value of 1), the bit [0] of the address byte indicating the device is being addressed to read data from the device. |
| Wr | Write (bit value of 0), the bit [0] of the address byte indicating the device is being addressed to write data into the device. |
| R/W# | General representation of bit [0] of the address byte. |
| A (unshaded) | An Acknowledge (ACK) bit sent from the host |
| A (shaded) | An Acknowledge (ACK) bit sent from a slave device |
| N (unshaded) | A Not Acknowledge (NACK) bit sent from the host |
| N (shaded) | A Not Acknowledge (NACK) bit sent from a slave device |
| X | A "don't care" bit that may have a value of 0 or 1 sent from the slave device |

It is noted that the START, REPEATED START, and STOP conditions are transitions and not bits. The Quick Command protocol is shown in FIG. 5A, which can be used to simply turn a device function on or off, or enable/disable a low power standby mode, or the like. In the Quick Command, the master (i.e. the storage device controller) sends a START condition (S) that transitions the BDat line to a low state, signifying the start of a command protocol. The master then sends a serial bus device address (Device Address) to the SMBus. The R/W # symbol shown in the transaction represents bit[0] of the device address byte, and is used to denote the command. The slave (i.e. the serial bus device) corresponding to the device address accepts the data transaction, and sends an acknowledgement (Ack, A) to the master to signify performance of the command. The master then sends a STOP condition (P) to transition the SMBus back to the high state, signifying the end of the command protocol.

The Send Byte protocol is shown in FIG. 5B, which can send up to 256 possible encoded commands in the form of a byte that follows the device address of the slave. All or parts of the Send Byte can contribute to the command. For example, the highest 7 bits of the command code could specify an access to a feature, while the least significant bit could tell the device to turn the feature on or off. In another example, a serial bus device may set the "volume" of its output based on the value it received from the Send Byte protocol. In practice, the master sends a START to transition the SMBus, then sends the device address along with a Write Bit (Wr) command to indicate that the slave is being written to. Once the slave sends the Ack, the master sends the Data Byte, the slave sends another Ack, and the master transitions (P) the SMBus back to the default state.

Figure 5C:
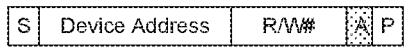
FIG. 5C is a schematic illustration of a communication transaction of an SMBus communication protocol in accordance with an example embodiment.
Figure 5C:
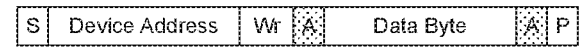
Figure 5C:
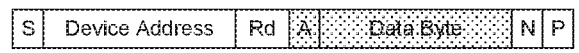

The Receive Byte protocol is shown in FIG. 5C, which is similar to the Send Byte protocol, with the exception being the direction of the data transfer. A serial bus device may have information that the storage device controller or host needs. The serial bus device can provide this information using the Receive Byte protocol, and the same serial bus device can accept both Send Byte and Receive Byte protocols. The NACK (N; a '1' in the ACK bit position) signifies the end of a read transfer.

Figure 5D:
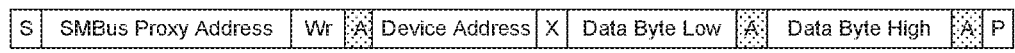
FIG. 5D is a schematic illustration of a communication transaction of an SMBus communication protocol in accordance with an example embodiment.

The Host Notify protocol is shown in FIG. 5D. To prevent messages coming to the storage device controller from unknown devices in unknown formats, the Host Notify protocol is used. When a serial bus device is using the Host Notify protocol, the serial bus device is functioning as a master, and the storage device controller is functioning as a slave. As such, the shading shown in FIG. 5D reflects this change in roles for this particular protocol. The transaction sequence begins with a START, followed by the storage device controller or serial bus controller address, and then a Write Bit command, to which the storage device controller sends an Ack to the serial bus device. The next byte sent is the alerting serial bus device's address, followed by an "I don't care" bit. The next bytes sent include the data to be written, interspersed with Acks from the storage device controller. This protocol allows the storage device controller to know the origin of the received serial bus device's status.

Figure 5E:
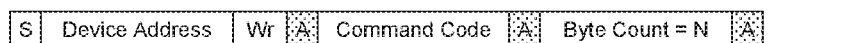
FIG. 5E is a schematic illustration of a communication transaction of an SMBus communication protocol in accordance with an example embodiment.
Figure 5E:
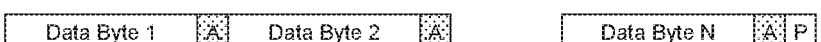

The Block Write protocol is shown in FIG. 5E, which begins with a serial bus device address and a write condition (Wr). Following a command code, the master sends a byte count that describes how many more bytes will follow in the transaction. SMBus Specification 2.0 allows a Block Write transaction to transfer a maximum of 32 data bytes, and SMBus Specification 3.0 allows a maximum of 255 data bytes in the transfer.

Figure 5F:
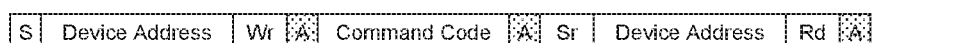
FIG. 5F is a schematic illustration of a communication transaction of an SMBus communication protocol in accordance with an example embodiment.
Figure 5F:
Figure 5F:

The Block Read protocol is shown in FIG. 5F, which begins with a serial bus device address and a write condition (Wr). Following a command code, the master sends a repeated START (Sr) and the serial bus device address with a read condition (Rd). The repeated START condition exists to signify a change in the transfer direction. Next, the slave sends a block count to the master that describes the amount of data that will follow in the transaction. A negative Ack (NACK) immediately preceding the STOP (P) condition signifies the end of the read transfer. SMBus Specification 2.0 allows a Block Read transaction to transfer a maximum of 32 data bytes, and SMBus Specification 3.0 allows a maximum of 255 data bytes in the transfer.

Multiple SSDs associated together in a device or system in a variety of ways, depending on the design of the device or system and the use of the memory storage. For example, in one embodiment the SSDs can be located in a common chassis with an associated computer system, where a central processing unit (CPU), memory controller, power supply, networking, and all other components of the computer system are present in the chassis. In another example, the SSDs can be located in a chassis that is coupled to a computer system, a network, a data center, a multi-node computing system, or the like. In such cases, the level of integration of the coupled system into the chassis of the SSDs can vary, and should not be seen as limiting the present scope. Additionally, a system utilizing multiple SSDs organized into a chassis can communicate with a single chassis of SSDs, or can communicate with multiple chassis, each including multiple SSDs.

Figure 6:
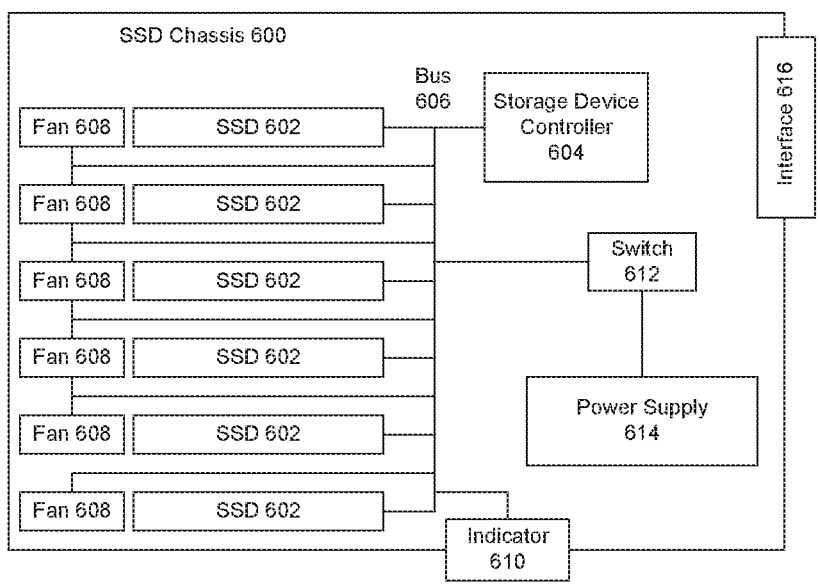
FIG. 6 is a schematic illustration of a SSD chassis in accordance with an example embodiment.

In one high-level example, shown in FIG. 6, a SSD chassis 600 can include multiple SSDs 602 that are coupled to a storage device controller 604 over a serial bus 606. The chassis 600 is communicatively coupleable to a host via an interface 616, such as and interface connector, network connection, or the like. The chassis 600 can include any serial bus device that has utility for the chassis, any of the components in a chassis, or any other aspect of the associated host or host system. One example serial bus device, as shown in FIG. 6, can be one or more fans 608, either associated with each SSD 602, or associated with a specific region or area of the chassis. In another example, one or more indicators 610 can be included in the chassis that are coupled to the serial bus 606. The indicator 610 can be a visual indicator, an auditory indicator, an electronic indicator coupled to another associated system or device, or the like. The indicator 610 can provide operational, performance, maintenance, or any other relevant information, displayed in a manner appropriate to the intended receiver. Additionally, the indicator 610 can provide such information for the chassis, for any of the SSDs 602, or for any other component of the chassis.

As another example of a serial bus device, FIG. 6 also shows a switch 612 coupled to a power supply 614 that provides power to the chassis. While the chassis can include a power supply 614, in some examples, power can be provided by the system to which the chassis connected. In such cases, switch 612 can be coupled across the power input from the system. The switch 612 can thus receive commands from the storage device controller 604 over the serial bus 606 to regulate power to the chassis 600, regulate the power distribution within the chassis 600, or the like.

Figure 7:
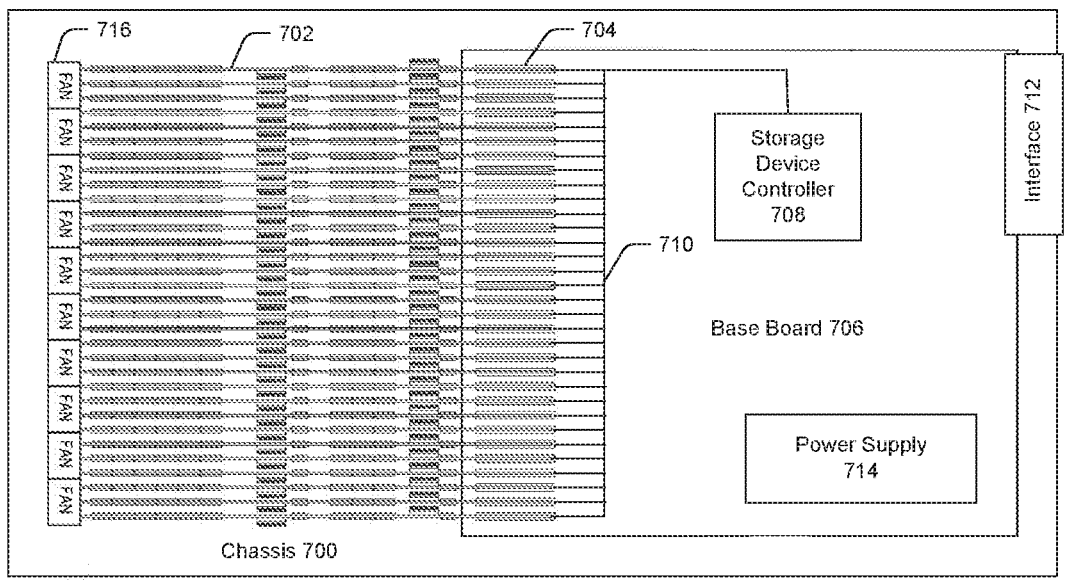
FIG. 7 is a schematic illustration of a SSD chassis in accordance with an example embodiment.

FIG. 7 shows another example embodiment of a SSD chassis 700 including multiple SSDs 702 coupled to SSD connectors 704 mounted on a base board 706. A storage device controller 708 is coupled to each SSD 702 via a serial bus 710 through the SSD connectors 704. The chassis 700 includes an interface 712 that communicatively couples a host with the storage device controller 708. FIG. 7 additionally shows a power supply 714 to provide power to the chassis 700. In some examples, however, the chassis 700 can be powered by the host through the interface 712. Multiple fans 716 can be included in the chassis 700, positioned at or near the SSDs 702, where each fan can cool one or more SSD. Additional serial bus devices can additionally be included, as has been described.

In one example, the SSDs 702 shown in FIG. 7 are expansion card-type SSD devices, which may or may not have individual housings. These SSD devices can also be referred to as "blade SSDs," "ruler SSDs," or the like. As such, the SSD connectors 704 can be expansion slots arranged along the base board 706, and the SSDs 702 can be coupled to these expansion slots in an arrangement that is parallel to one another. The parallel arrangement can facilitate cooling through increased airflow between the SSDs.

Figure 8:
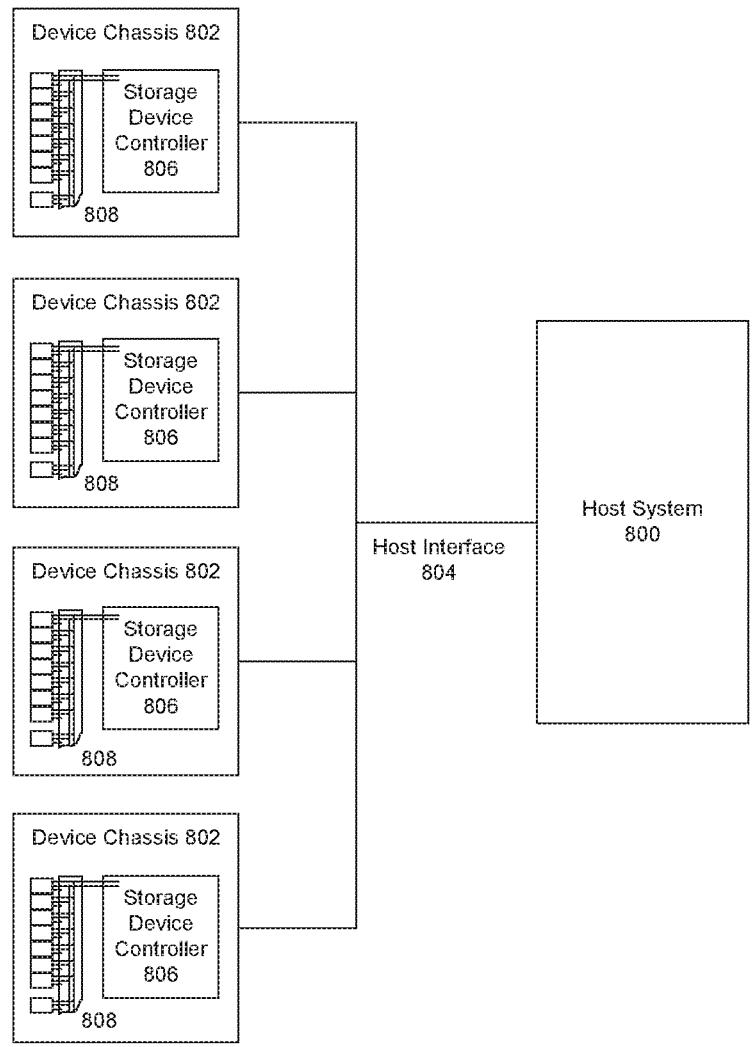
FIG. 8 is a schematic illustration of multiple SSD chassis of a system in accordance with an example embodiment.

FIG. 8 shows one example of a system that incorporates multiple SSD chassis. In this example, a host system 800 is communicatively coupled to multiple device chassis 802 over a host communication interface 804. Each device chassis 802 includes a storage device controller 806 and a serial bus coupleable to multiple SSDs (shown collectively at 808). The storage device controller 806 in each device chassis 802 thus monitors and controls the operation and performance of the SSDs in that device chassis with positional awareness. In other examples, however, one or more storage device controllers can be located external to the device chassis, and thus monitor and control the operation and performance of collections of SSDs that span multiple device chassis.

Figure 9:
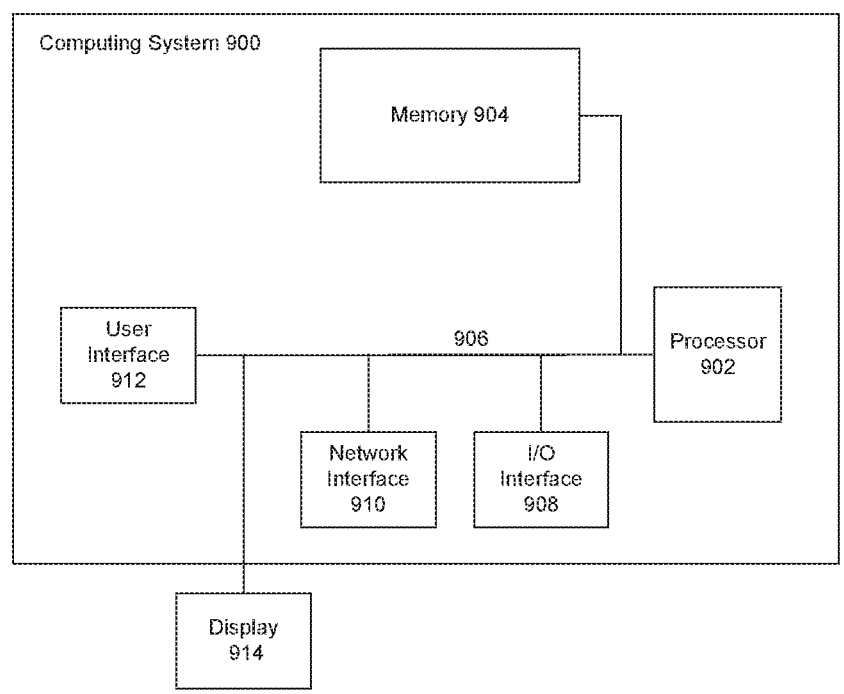
FIG. 9 is a schematic illustration of a computing system in accordance with an example embodiment.

FIG. 9 illustrates an example of a general computing system or device 900 that can be employed in the present technology, in some examples as a host system. While any type or configuration of device or computing system is contemplated to be within the present scope, non-limiting examples can include self-contained computer systems, node computing systems, System on a Chip (SoC) systems, server systems, networking systems, storage systems, high capacity memory systems, or the like. The computing system 900 can include one or more processors 902 in communication with a memory 904. The memory 904 can include any device, combination of devices, circuitry, or the like, that is capable of storing, accessing, organizing, and/or retrieving data. Additionally, a communication interface 906, such as a local communication interface, for example, provides connectivity between the various components of the system. For example, the communication interface 906 can be a local data bus and/or any related address or control busses as may be useful.

The computing system 900 can also include an I/O (input/output) interface 908 for controlling the I/O functions of the system, as well as for I/O connectivity to devices outside of the computing system 900. A network interface 910 can also be included for network connectivity. The network interface 910 can control network communications both within the system and outside of the system, and can include a wired interface, a wireless interface, a Bluetooth interface, optical interface, communication fabric, and the like, including appropriate combinations thereof. Furthermore, the computing system 900 can additionally include a user interface 912, a display device 914, as well as various other components that would be beneficial for such a system.

The processor 902 can be a single or multiple processors, including single or multiple processor cores, and the memory can be a single or multiple memories. The local communication interface can be used as a pathway to facilitate communication between any of a single processor or processor cores, multiple processors or processor cores, a single memory, multiple memories, the various interfaces, and the like, in any useful combination.

The memory 904 can include a memory with volatile memory, NVM, or a combination thereof. Volatile memory is a storage medium that requires power to maintain the state of data stored by the medium. Exemplary memory can include any combination of random access memory (RAM), such as static random access memory (SRAM), dynamic random access memory (DRAM), synchronous dynamic random access memory (SDRAM), and the like. In some examples, DRAM complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org).

NVM, as has been described, is a storage medium that does not require power to maintain the state of data stored by the medium. Nonlimiting examples of NVM can include any or a combination of solid state memory (such as planar or three-dimensional (3D) NAND flash memory, NOR flash memory, or the like), including solid state drives (SSD), cross point array memory, including 3D cross point memory, phase change memory (PCM), such as chalcogenide PCM, non-volatile dual in-line memory module (NVDIMM), a network attached storage, byte addressable nonvolatile memory, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, spin transfer torque (STT) memory, nanowire memory, electrically erasable programmable read-only memory (EEPROM), magnetic storage memory, hard disk drive (HDD) memory, a redundant array of independent disks (RAID) volume, a, write in place non-volatile MRAM (NVMRAM), and the like. In some examples, non-volatile memory can comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data.

EXAMPLES

The following examples pertain to specific embodiments and point out specific features, elements, or steps that can be used or otherwise combined in achieving such embodiments.

In one example, there is provided an electronic device comprising a multi-wire serial bus further including a BClk line and a BDat line, a serial bus controller coupled to the multi-wire serial bus, and a plurality of SSD connectors coupled to the multi-wire serial bus. Each SSD connector comprises a BClk connector serially coupled to the BClk line of the multi-wire serial bus, a BDat connector serially coupled to the BDat line of the multi-wire serial bus, and a BPos connector coupled to a BPos to uniquely identify the physical position of each SSD connector with a unique BPos ID.

In one example of a device, the BClk line and the BDat line are coupled between the serial bus controller and each of the plurality of SSD connectors across a connectivity plane.

In one example of a device, a first SSD connector of the plurality of SSD connectors has a BPos ID associated with a first physical position, the BClk line is coupled across the connectivity plane to the BClk connector of the first SSD connector, and the BDat line is coupled across the connectivity plane to the BDat connector of the first memory device.

In one example of a device, an BClk crossing net is coupled across the connectivity plane between the BClk line and the BClk connectors of the plurality of SSD connectors, and a BDat crossing net is coupled across the connectivity plane between the BDat line and the BDat connectors of the plurality of SSD connectors.

In one example of a device, the BClk crossing net is a single BClk crossing net and the BDat crossing net is a single BDat crossing net.

In one example of a device, the device further comprises a second multi-wire serial bus comprising a second BClk line coupled to the BClk crossing net and a second BDat line coupled to the BDat crossing net, and a second serial bus controller coupled to the second BClk line and the second BDat line of the second multi-wire serial bus.

In one example of a device, the connectivity plane comprises a PCB that includes at least one of the serial bus controller or the plurality of SSD connectors integrated thereon.

In one example of a device, the connectivity plane comprises a PCB that removably couples to both the serial bus controller and the plurality of SSD connectors.

In one example of a device, the BPos ID is represented by a value-type selected from the group consisting of an encoded value, a voltage level value, a resistance level value, a capacitance level value, and combinations thereof.

In one example of a device, the BPos ID is represented by a 3-bit encoded value.

In one example of a device, the serial bus controller further comprises serial bus controller circuitry configured to allow the serial bus controller to communicate with each of a plurality of SSDs coupled to the plurality of SSD connectors with positional awareness.

In one example of a device, the serial bus controller further comprises a lookup table of the BPos ID associated with each SSD connector, and wherein the serial bus controller circuitry is further configured to communicate with a specific SSD at a known physical position by associating the BPos ID of the specific SSD with the communication.

In one example of a device, the device further comprises a plurality of SSDs coupled to the plurality of SSD connectors, where each SSD comprises a SSD BClk connector, a SSD BDat connector, and a SSD BPos connector respectively coupled to the BClk connector, the BDat connector, and the BPOS connector of a SSD connector of the plurality of SSD connectors.

In one example of a device, each SSD further comprises a NVM storage, a SSD serial bus controller coupled to the SSD BClk connector, the SSD BDat connector, and the SSD BPos connector, and SSD serial bus controller circuitry configured to receive the BPos ID from the BPos following coupling of the SSD with the SSD connector, set the BPos ID as a current BPos ID for the SSD, and respond to communications from the serial bus controller associated with the current BPos ID.

In one example of a device, the device further comprises at least one serial bus device communicatively coupled to the multi-wire serial bus, wherein the at least one serial bus device each has an BAddr.

In one example of a device, the at least one serial bus device is directly coupled to at least one of the plurality of SSDs.

In one example of a device, the at least one serial bus device is located apart from each of the plurality of SSDs.

In one example of a device, the at least one serial bus device includes a device selected from the group consisting of thermal sensors, tachometers, voltage sensors, current sensors, fan monitoring circuits, control panel consoles, NVM storage health monitors, power supply monitors, digital sensors, digital indicators, analog sensors, analog indicators, switches, and combinations thereof.

In one example of a device, the serial bus controller further comprises a lookup table further comprising the BPos ID associated with each SSD connector, and the BAddr associated with the at least one serial bus device, and wherein the serial bus controller circuitry is further configured to communicate with a specific serial bus device at a known physical position by associating the BPos ID of the specific SSD and the BAddr with the communication.

In one example of a device, the multi-wire serial bus includes a serial bus selected from the group consisting of Serial Peripheral Interface (SPI), Queued SPI (QSPI), Multichannel Buffered Serial Port (MCBSP), Microwire, Microwire plus, slave in/slave out (SISO), QuadSPI, mini-SPI (mSPI), Low Pin Count (LPC), enhanced SPI (eSPI), master output slave input/master input slave output (MOSI/MISO), Inter-Integrated Circuit (I2C), ACCESS.bus, Video Electronics Standards Association Display Data Channel (VESA DDC), Power Management Bus (PMBus), Intelligent Platform Management Bus (IPMB), Advanced Telecommunications Computing Architecture (AdvancedTCA), Micro Telecommunications Computing Architecture (MicroTCA), Two-Wire Interface (TWI), Two-Wire Serial Interface (TWSI), System Management Bus (SMBus), I3C, and combinations thereof.

In one example of a device, the multi-wire serial bus is a system management bus.

In one example, there is provided a memory system, comprising a multi-wire serial bus further comprising a BClk line and a BDat line, a plurality of SSD connectors coupled to the multi-wire serial bus, each comprising a BClk connector serially coupled to the BClk line of the multi-wire serial bus, a BDat connector serially coupled to the BDat line of the multi-wire serial bus, and a BPos connector coupled to a BPos to uniquely identify the physical position of each SSD connector with a unique BPos ID, a plurality of SSDs coupled to the plurality of SSD connectors, and a serial bus controller coupled to the multi-wire serial bus. The serial bus controller further comprises serial bus controller circuitry configured to communicate with a specific SSD at a known physical position by associating the BPos ID of the specific SSD with the communication.

In one example of a memory system, the serial bus controller is coupled to the plurality of SSD connectors by a single pair of BClk and BDat lines.

In one example of a memory system, the plurality of SSD connectors is coupled to the storage device controller by a single pair of BClk and BDat crossing nets.

In one example of a memory system, the memory system further comprises a second multi-wire serial bus comprising a second BClk line and a second BDat line coupled to the single pair of BClk and BDat crossing nets, and a second serial bus controller coupled to the second BClk line and the second BDat line of the second multi-wire serial bus.

In one example of a memory system, the memory system further comprises at least one serial bus device communicatively coupled to the multi-wire serial bus, wherein the at least one serial bus device each has an BAddr.

In one example of a memory system, the at least one serial bus device is directly coupled to at least one of the plurality of SSDs.

In one example of a memory system, the at least one serial bus device is located apart from each of the plurality of SSDs.

In one example of a memory system, the at least one serial bus device includes a device selected from the group consisting of thermal sensors, tachometers, voltage sensors, current sensors, fan monitoring circuits, control panel consoles, NVM storage health monitors, power supply monitors, digital sensors, digital indicators, analog sensors, analog indicators, switches, and combinations thereof.

In one example of a memory system, the serial bus controller further comprises a lookup table further comprising the BPos ID associated with each SSD connector, and the BAddr associated with the at least one serial bus device, and wherein the serial bus controller circuitry is further configured to communicate with a specific serial bus device at a known physical position by associating the BPos ID of the specific SSD and the BAddr with the communication.

In one example of a memory system, the memory system further comprises a host interface coupled to the serial bus controller.

In one example of a memory system, the multi-wire serial bus includes a serial bus selected from the group consisting of Serial Peripheral Interface (SPI), Queued SPI (QSPI), Multichannel Buffered Serial Port (MCBSP), Microwire, Microwire plus, slave in/slave out (SISO), QuadSPI, mini-SPI (mSPI), Low Pin Count (LPC), enhanced SPI (eSPI), master output slave input/master input slave output (MOSI/MISO), Inter-Integrated Circuit (I2C), ACCESS.bus, Video Electronics Standards Association Display Data Channel (VESA DDC), Power Management Bus (PMBus), Intelligent Platform Management Bus (IPMB), Advanced Telecommunications Computing Architecture (AdvancedTCA), Micro Telecommunications Computing Architecture (MicroTCA), Two-Wire Interface (TWI), Two-Wire Serial Interface (TWSI), System Management Bus (SMBus), I3C, and combinations thereof.

In one example of a memory system, the multi-wire serial bus is a system management bus.

In one example, there is provided a computer-implemented method for performing positionally aware communications between a serial bus controller and a plurality of SSDs over a multi-wire serial bus, comprising sending, from a serial bus controller over a multi-wire serial bus, a transaction to a specific SSD at a specific physical position from within a plurality of SSDs, wherein the transaction comprises a BPos ID that represents the specific physical position of the specific SSD, receiving, at the specific SSD, the transaction, performing the transaction by a SSD serial bus controller in the SSD, and acknowledging, from the specific SSD over the multi-wire serial bus, the performance of the transaction to the serial bus controller.

In one example of a method, performing the transaction further comprises sending data from the specific SSD to the serial bus controller over the multi-wire serial bus.

In another example of the method, the data is retrieved from a serial bus device.

The invention claimed is:

1. An electronic device, comprising:
 a multi-wire serial bus comprising a serial bus clock (BClk) line and a serial bus data (BDat) line;
 a serial bus controller coupled to the multi-wire serial bus;
 a plurality of solid state drive (SSD) connectors coupled to the multi-wire serial bus, each comprising:

a BClk connector serially coupled to the BClk line of the multi-wire serial bus;
a BDat connector serially coupled to the BDat line of the multi-wire serial bus; and
a serial bus position address (BPos) connector coupled to a BPos to uniquely identify a physical position of each SSD connector with a unique BPos identifier (ID);
a BClk crossing net between the BClk line and the BClk connectors of the plurality of SSD connectors;
a BDat crossing net between the BDat line and the BDat connectors of the plurality of SSD connectors;
a second multi-wire serial bus comprising a second BClk line coupled to the BClk crossing net and a second BDat line coupled to the BDat crossing net; and
a second serial bus controller coupled to the second BClk line and the second BDat line of the second multi-wire serial bus.

2. The electronic device of claim 1, wherein the BClk line and the BDat line are coupled between the serial bus controller and each of the plurality of SSD connectors across a connectivity plane.

3. The electronic device of claim 2, wherein:
a first SSD connector of the plurality of SSD connectors has a BPos ID associated with a first physical position;
the BClk line is coupled across the connectivity plane to the BClk connector of the first SSD connector; and
the BDat line is coupled across the connectivity plane to the BDat connector of the first SSD connector.

4. The electronic device of claim 3, wherein the BClk crossing net is a single BClk crossing net and the BDat crossing net is a single BDat crossing net.

5. The electronic device of claim 1, wherein the BPos ID is represented by a value-type selected from the group consisting of an encoded value, a voltage level value, a resistance level value, a capacitance level value, and combinations thereof.

6. The electronic device of claim 5, wherein the BPos ID is represented by a 3-bit encoded value.

7. The electronic device of claim 1, wherein the serial bus controller further comprises:
serial bus controller circuitry configured to allow the serial bus controller to communicate with each of a plurality of SSDs coupled to the plurality of SSD connectors with positional awareness.

8. The electronic device of claim 7, wherein the serial bus controller further comprises:
a lookup table of the BPos ID associated with each SSD connector; and
wherein the serial bus controller circuitry is further configured to:
communicate with a specific SSD at a known physical position by associating the BPos ID of the specific SSD with the communication.

9. The electronic device of claim 1, further comprising:
a plurality of SSDs coupled to the plurality of SSD connectors, where each SSD comprises:
a SSD BClk connector, a SSD BDat connector, and a SSD BPos connector respectively coupled to the BClk connector, the BDat connector, and the BPos connector of a SSD connector of the plurality of SSD connectors.

10. The electronic device of claim 9, wherein each SSD further comprises:
a NVM storage;
a SSD serial bus controller coupled to the SSD BClk connector, the SSD BDat connector, and the SSD BPos connector, the SSD serial bus controller further comprising;
SSD serial bus circuitry configured to:
receive the BPos ID from the BPos following coupling of the SSD to the SSD connector;
set the BPos ID as a current BPos ID for the SSD; and
respond to communications from the serial bus controller associated with the current BPos ID.

11. The electronic device of claim 9, further comprising at least one serial bus device communicatively coupled to the multi-wire serial bus, wherein the at least one serial bus device each has a serial bus address (BAddr).

12. The electronic device of claim 11, wherein the at least one serial bus device is directly coupled to at least one of the plurality of SSDs.

13. The electronic device of claim 12, wherein the serial bus controller further comprises:
a lookup table further comprising:
the BPos ID associated with each SSD connector; and
the BAddr associated with the at least one serial bus device, and wherein the serial bus controller is to:
communicate with a specific serial bus device at a known physical position by associating the BPos ID of a specific SSD and the BAddr of the specific serial bus device with the communication.

14. The electronic device of claim 11, wherein the at least one serial bus device is located apart from each of the plurality of SSDs.

15. The electronic device of claim 1, wherein the multi-wire serial bus includes a serial bus selected from the group consisting of Serial Peripheral Interface (SPI), Queued SPI (QSPI), Multichannel Buffered Serial Port (MCBSP), Microwire, Microwire plus, slave in/slave out (SISO), QuadSPI, mini-SPI (mSPI), Low Pin Count (LPC), enhanced SPI (eSPI), master output slave input/master input slave output (MOSI/MISO), Inter-Integrated Circuit (I2C), ACCESS.bus, Video Electronics Standards Association Display Data Channel (VESA DDC), Power Management Bus (PMBus), Intelligent Platform Management Bus (IPMB), Advanced Telecommunications Computing Architecture (AdvancedTCA), Micro Telecommunications Computing Architecture (MicroTCA), Two-Wire Interface (TWO, Two-Wire Serial Interface (TWSI), System Management Bus (SMBus), I3C, and combinations thereof.

16. The electronic device of claim 1, wherein the multi-wire serial bus is a system management serial bus.

17. A memory system, comprising:
a multi-wire serial bus comprising a serial bus clock (BClk) line and a serial bus data (BDat) line;
a plurality of solid state drive (SSD) connectors coupled to the multi-wire serial bus, each comprising:
a BClk connector serially coupled to the BClk line of the multi-wire serial bus;
a BDat connector serially coupled to the BDat line of the multi-wire serial bus; and
a serial bus position address (BPos) connector coupled to a BPos to uniquely identify a physical position of each SSD connector with a unique BPos identifier (ID);
a BClk crossing net between the BClk line and the BClk connectors of the plurality of SSD connectors;
a BDat crossing net between the BDat line and the BDat connectors of the plurality of SSD connectors;

a second multi-wire serial bus comprising a second BClk line coupled to the BClk crossing net and a second BDat line coupled to the BDat crossing net;

a plurality of SSDs coupled to the plurality of SSD connectors;

a serial bus controller coupled to the multi-wire serial bus, the serial bus controller comprising:

serial bus controller circuitry configured to communicate with a specific SSD at a known physical position by associating the BPos ID of the specific SSD with the communication; and a second serial bus controller coupled to the second multi-wire serial bus.

18. The memory system of claim 17, further comprising at least one serial bus device communicatively coupled to the multi-wire serial bus, wherein the at least one serial bus device each has a serial bus address (BAddr).

19. The memory system of claim 18, wherein the at least one serial bus device is directly coupled to at least one of the plurality of SSDs.

20. The memory system of claim 19, wherein the serial bus controller further comprises:

a lookup table further comprising:
the BPos ID associated with each SSD connector; and
the BAddr associated with the at least one serial bus device, and wherein the serial bus controller circuitry is further configured to:
communicate with a specific serial bus device at a known physical position by associating the BPos ID of the specific SSD and the BAddr with the communication.

21. The memory system of claim 18, wherein the at least one serial bus device is located apart from each of the plurality of SSDs.

22. The memory system of claim 18, wherein the at least one serial bus device includes a device selected from the group consisting of thermal sensors, tachometers, voltage sensors, current sensors, fan monitoring circuits, control panel consoles, NVM storage health monitors, power supply monitors, digital sensors, digital indicators, analog sensors, analog indicators, switches, and combinations thereof.

23. The memory system of claim 17, wherein the multi-wire serial bus includes a serial bus selected from the group consisting of Serial Peripheral Interface (SPI), Queued SPI (QSPI), Multichannel Buffered Serial Port (MCBSP), Microwire, Microwire plus, slave in/slave out (SISO), QuadSPI, mini-SPI (mSPI), Low Pin Count (LPC), enhanced SPI (eSPI), master output slave input/master input slave output (MOSI/MISO), Inter-Integrated Circuit (I2C), ACCESS.bus, Video Electronics Standards Association Display Data Channel (VESA DDC), Power Management Bus (PMBus), Intelligent Platform Management Bus (IPMB), Advanced Telecommunications Computing Architecture (AdvancedTCA), Micro Telecommunications Computing Architecture (MicroTCA), Two-Wire Interface (TWI), Two-Wire Serial Interface (TWSI), System Management Bus (SMBus), I3C, and combinations thereof.

24. The memory system of claim 17, wherein the multi-wire serial bus is a system management serial bus.

25. A computer-implemented method for performing positionally aware communications between a serial bus controller and a plurality of solid state drives (SSD) over a multi-wire serial bus, comprising:

sending, from a serial bus controller over a multi-wire serial bus, a transaction to a specific SSD at a specific physical position from within a plurality of SSDs, wherein the transaction comprises a serial bus position (BPos) identifier (ID) that represents the specific physical position of the specific SSD, wherein the multi-wire serial bus includes:
a serial bus clock (BClk) line and a serial bus data (BDat) line;
a BClk crossing net between the BClk line and BClk connectors of SSD connectors of the plurality of SSDs;
a BDat crossing net between the BDat line and BDat connectors of the SSD connectors;

sending, from a second serial bus controller over a second multi-wire serial bus, a transaction to a second specific SSD at a second specific physical position from within the plurality of SSDs, wherein the transaction comprises a second serial bus position (BPos) identifier (ID) that represents the second specific physical position of the second specific SSD, wherein the second multi-wire serial bus includes:
a second BClk line coupled to the BClk crossing net and a second BDat line coupled to the BDat crossing net;

receiving, at the specific SSD, the transaction;

performing the transaction by a SSD serial bus controller in the SSD; and acknowledging, from the specific SSD over the multi-wire serial bus, the performance of the transaction to the serial bus controller.

26. The method of claim 25, wherein performing the transaction further comprises sending data from the specific SSD to the serial bus controller over the multi-wire serial bus.

\* \* \* \* \*